United States Patent [19]

Schwerdhoefer

[11] Patent Number: 5,190,501
[45] Date of Patent: Mar. 2, 1993

[54] METHOD OF MANUFACTURING BICYCLE CHAIN THROWER MECHANISM

[75] Inventor: Hans J. Schwerdhoefer, Schweinfurt, Fed. Rep. of Germany

[73] Assignee: Fichtel & Sachs AG, Schweinfurt, Fed. Rep. of Germany

[21] Appl. No.: 773,104

[22] Filed: Oct. 8, 1991

[30] Foreign Application Priority Data

Oct. 9, 1990 [DE] Fed. Rep. of Germany ....... 4031982

[51] Int. Cl.⁵ .............................................. F16H 61/00
[52] U.S. Cl. ..................................... 474/80; 264/242; 264/251
[58] Field of Search ..................... 474/78–83, 474/101, 161–163; 475/297; 74/488, 501.6, 665. GE; 264/242, 251, 255

[56] References Cited

U.S. PATENT DOCUMENTS

| | | | |
|---|---|---|---|
| 2,577,350 | 12/1951 | Morin | 18/55 |
| 3,000,049 | 9/1961 | Terry, Jr. | 16/139 |
| 4,500,302 | 2/1985 | Crépin | 474/82 |
| 4,618,332 | 10/1986 | Nagano | 474/80 |
| 4,670,000 | 6/1987 | Nagano | 474/80 |
| 4,925,201 | 5/1990 | Leonard | 192/64 X |

FOREIGN PATENT DOCUMENTS

| | | |
|---|---|---|
| 0107550 | 5/1984 | European Pat. Off. |
| 0374577 | 6/1990 | European Pat. Off. |
| 1246447 | 8/1967 | Fed. Rep. of Germany |
| 1605784 | 4/1971 | Fed. Rep. of Germany |
| 1505949 | 8/1973 | Fed. Rep. of Germany |
| 3637462 | 5/1988 | Fed. Rep. of Germany |
| 2515604 | 5/1983 | France |
| 2520693 | 8/1983 | France |
| 0593852 | 10/1947 | United Kingdom |
| 0593853 | 10/1947 | United Kingdom |
| 0594375 | 11/1947 | United Kingdom |
| 0840686 | 7/1960 | United Kingdom |
| 1090386 | 11/1967 | United Kingdom |
| 1402068 | 8/1975 | United Kingdom |
| 1515869 | 6/1978 | United Kingdom |
| 2110322 | 6/1983 | United Kingdom |
| 2154502 | 9/1985 | United Kingdom |
| 0593335 | 10/1987 | United Kingdom |

*Primary Examiner*—Ramon S. Britts
*Assistant Examiner*—Roger J. Schoeppel
*Attorney, Agent, or Firm*—Brumbaugh, Graves, Donohue & Raymond

[57] ABSTRACT

In a chain thrower mechanism of a bicycle dérailleur gear mechanism a parallelogram is formed by at least four parts. One of these parts is prefabricated by injection moulding with respective hinge portions. A second of these parts is formed with respective hinge portions by using one hinge portion of the prefabricated part as a shape-giving part for injection moulding of the other part.

23 Claims, 3 Drawing Sheets

METHOD OF MANUFACTURING BICYCLE CHAIN THROWER MECHANISM

BACKGROUND OF THE INVENTION

This invention relates to a chain thrower mechanism for gear change operations in a bicycle. In bicycles a gear change can be effected by dislocating the bicycle chain between chain sprockets of different teeth number and different size, which sprockets are connected for common rotation either with a pedalling shaft of the respective bicycle or with a driver member of the rear-wheel of the respective bicycle.

Such chain thrower mechanisms generally comprise two terminal members, namely a frame side terminal member adapted to be fastened on a bicycle frame, and a thrower side terminal member adapted to be assembled with a chain thrower unit, and further comprise at least one connecting member hingedly connected with both said terminal members for guiding said thrower side terminal member along a predetermined path with respect to said frame side terminal member. This chain thrower unit is adapted for engagement with a bicycle chain and for dislocating this bicycle chain between at least two chain sprockets in response to movement of the thrower side terminal member along said predetermined path.

In most cases the chain thrower mechanism comprises two connecting members which form together with the terminal members an articulated parallelogram arrangement.

STATEMENT OF THE PRIOR ART

From a periodical "Radmarkt" 9/1984, page 142, it is known to produce certain components of a gear change mechanism from plastics materials such as Delrin 500 by injection moulding.

From the published German patent application 1 246 447 and the respective patents of addition 1 505 949 and 1 605 784 it is further known that certain components of a chain thrower mechanism can be manufactured from plastics material. In these publications the joints between adjacent components of the chain thrower mechanism are well-established joints composed of separately manufactured bolt-and-eye components.

All known chain thrower mechanisms including those which comprise plastics components have the drawback of high manufacturing costs. These manufacturing costs are considerably influenced by the assembly of the pre-fabricated components of the chain thrower mechanism. It has been tried to create automatic assembly machines for assembling these components. Such automatic assembling machines, however, involve very high investment costs and, nevertheless, do not avoid a considerable amount of human labour.

OBJECT OF THE INVENTION

It is a primary object of the invention to create a manufacturing method for manufacturing a chain thrower mechanism which reduces the costs of involved human labour and the costs of automatic assembling appliances.

A further object of the invention is to provide a chain thrower mechanism which is highly precise as to its guiding function. A still further object is to obtain a chain thrower mechanism having a reduced weight. Furthermore, it is an object of the invention to obtain a chain thrower mechanism which is less liable to wear during its useful life. A further object is to facilitate the manufacturing of various components of a chain thrower mechanism with different colours in view of an attractive appearance of the mechanism.

SUMMARY OF THE INVENTION

In order to achieve at least part of the above mentioned objects a method of manufacturing of a chain thrower mechanism is proposed. The chain thrower mechanism comprises two terminal members, namely a frame side terminal member adapted to be fastened on a bicycle frame, and a thrower side terminal member adapted to be assembled with a chain thrower unit. Further this chain thrower mechanism comprises at least one, and preferably two, connecting members hingedly connected with both said terminal members for guiding said thrower side terminal member along a predetermined path with respect to the frame side terminal member. The chain thrower unit is adapted for engagement with a bicycle chain and for dislocating the bicycle chain between at least two chain sprockets in response to movement of the thrower side terminal member along the predetermined path.

In such a chain thrower mechanism at least one articulated component assembly of said chain thrower mechanism exists which comprises at least two components, one of said at least two components being at least a part of one of said terminal members and another one of said at least two components being at least a part of a connecting member. These at least two components are articulated with respect to each other by a joint having a joint-axis. This joint is established by respective complementary and mutually engaged hinge portions of said components.

This at least one component assembly can be manufactured according to this invention by a) prefabricating a first one of said at least two components with a respective hinge portion;

b) providing a mould cavity for moulding a second one of said at least two components, said mould cavity being partially confined by said first component such that the hinge portion of said first component is inside of and in fluid flow communication with said mould cavity;

c) filling said mould cavity with a liquid moulding material such as to obtain said second component with the respective hinge portion of said second component being shaped by the complementary hinge portion of said first component.

According to this method at least part of the joints of a chain thrower mechanism can be obtained by moulding, and, more particularly by injection moulding, the respective components without additional assembling operations for the joints being necessary.

Needless to say that also said first component can be prefabricated by a moulding operation, and, more particularly, by injection moulding.

Preferably, the second component made from a liquid moulding material is subject to shrinkage during or after hardening. This shrinkage can be used for providing the necessary play between the respective hinge portions. On the other hand, the shrinkage can be selected such that this play does not deteriorate the precise mutual engagement of the hinge portions such that a precise movement of the mechanism is still maintained. The complementary hinge portion of said first and said second components may be shaped and dimensioned such that pivotal movement of said first and said second components in said joint becomes possible after hardening and shrinkage of the second component by a mutual bearing play of the respective hinge portions, which bearing play is a result of shrinkage of the hinge portion of the second component.

The hinge portion of said first component may be at least partially coated with a separating agent before filling the liquid moulding material into the mould cavity. The separating agent prevents physical coalescing of the hinge portions of the first and second component.

Another possibility for avoiding physical coalescing of the components exists in that said first component and said second component are made of different materials, said difference of materials preventing physical coalescing of the hinge portions of said first and said second components. The difference of materials may be a consequence of different amounts of additives, particularly sliding additives, added to the respective materials. Such the basic materials of the basic components may be identical and differ only in their additives.

In order to obtain an attractive appearance of the mechanism the first and said second components are made of materials having different colour. Again, the basic materials of the various components may be identical and contain different colour additives.

A most precise joint construction is obtained if the hinge portion of the prefabricated components comprises a cylindrical hinge cavity, and the hinge portion of the second component comprises a cylindrical pin portion being shaped by inflow of the moulding material into the respective hinge cavity.

If the articulated component assembly comprises more than two components, at least one component with respective hinge portions may be shaped by moulding the moulding material into a respective mould cavity, said respective mould cavity being partially confined by at least two prefabricated further components having respective complementary portions. Such it is e.g. possible that two connecting members are prefabricated with respective hinge portions at both respective ends. Hereupon mould cavities for two terminal members are established. Both said mould cavities are partially confined by respective hinge portions of both connecting members. Such the two terminal members can be moulded substantially simultaneously in one single mould unit comprising two mould cavities.

Alternatively, at least two components with respective hinge portions may be shaped by moulding the moulding material into respective mould cavities, said respective mould cavities being partially confined by at least one prefabricated further component having respective complementary hinge portions. In this way a parallelogram shaped chain thrower mechanism can be shaped as follows: Two terminal members are prefabricated. In using one of these prefabricated terminal members, two mould cavities are established for moulding two connecting members hinged to the prefabricated terminal members. Hereupon the second prefabricated terminal member may be hinged in the classic way to the free ends of the connecting member. Moreover, it is also possible that both prefabricated terminal members are used for establishing two moulding cavities for two respective connecting members. Such the two connecting members may be moulded and simultaneously hinged to the terminal members by substantially simultaneous mould filling operations with one single mould arrangement.

If the articulated component assembly comprises two pairs of analogous components, namely a pair of terminal members and a pair of connecting members, the analogous components of a first pair may be prefabricated with respective hinge portions, and the analogous components of the other pair may be shaped by filling the moulding material into respective mould cavities partially confined by the prefabricated analogous components.

In this method either the terminal members may be prefabricated, or the connecting members may be prefabricated.

In order to facilitate the mounting of additional parts to one or more components of a chain thrower mechanism such as Bowden wire anchoring parts, it may be desirable that only a part of the joints of a mechanism are obtained by filling a moulding material into a mould cavity partially confined by a prefabricated component, while the remaining joints may be established by assembling respective preshaped hinge portions. In particular, it is possible to manufacture an articulated component assembly comprising two pairs of analogous components, namely a pair of terminal members and a pair of connecting members with a total number of four joints, such that three of said joints are obtained by filling liquid moulding material into respective mould cavities partially confined by at least one prefabricated component, while the fourth joint is obtained by assembling respective hinge portions.

A further preferred method consists in that the chain thrower mechanism is completed by combining at least two articulated component assemblies. This combination is performed by composing at least one of said terminal members and said connecting members from respective partial members at a location remote from the respective joints. In particular, a chain thrower mechanism comprising two terminal members and two connecting members in parallelogram arrangement may be manufactured as follows: A first articulated component assembly comprising one connecting member and adjacent parts of the terminal members is produced; a second articulated component assembly comprising the other connecting member and the remaining parts of the terminal members is produced, respective parts of the terminal members are hereupon composed such as to form the terminal members. Parts of the terminal members may be fastened to each other by well-known fastening methods such as adhesive bonding or ultrasonic welding.

The mould cavity may be filled with liquid moulding material by injection moulding. The liquid moulding material may be a synthetic plastics material, e.g. thermoplastics.

This invention further relates to a chain thrower mechanism for gear change in a bicycle. The chain thrower mechanism comprises two terminal members, namely a frame side terminal member adapted to be fastened on a bicycle frame, and a thrower side terminal member adapted to be assembled with a chain thrower unit. At least one connecting member is hingedly connected with both said terminal members for guiding the thrower side terminal member along a predetermined path with respect to the frame side terminal member. The chain thrower unit is adapted for engagement with a bicycle chain and for dislocating the bicycle chain between at least two chain sprockets in response to movement of the thrower side terminal member along the predetermined path. At least one articulated component assembly of said chain thrower mechanism comprises at least two components, one of said at least two components being at least a part of one of said terminal members and another one of said at least two components being at least a part of a connecting member.

These at least two components are articulated with respect to each other by a joint having a joint-axis. This joint is established by respective complementary and mutually engaged hinge portions of these components. The complementary hinge portions are mutually engaged by prefabricating a first component with a respective hinge portion and moulding a second component with the respective hinge portion in using said hinge portion of said first component as a shape giving part for said hinge portion of said second component.

The various features of novelty which characterize the invention are pointed out with particularity in the claims annexed hereto and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereinafter with reference to an embodiment shown in the accompanying drawings in which.

Figure 2:
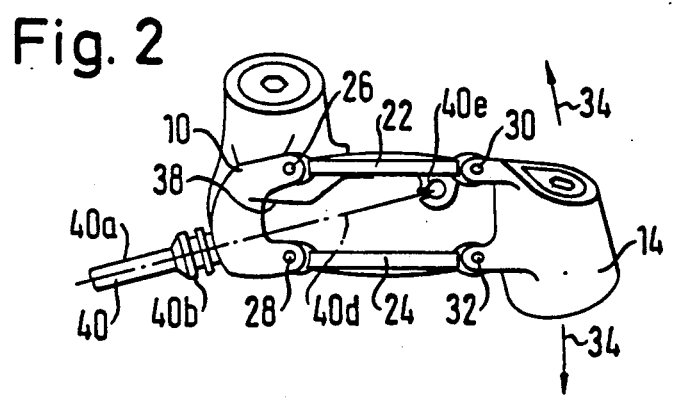
FIG. 2 shows a view from below according to arrow II of FIG. 1 according to a first embodiment.
Figure 4:
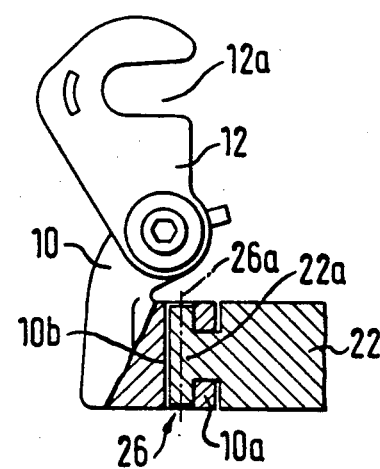
Figure 5:
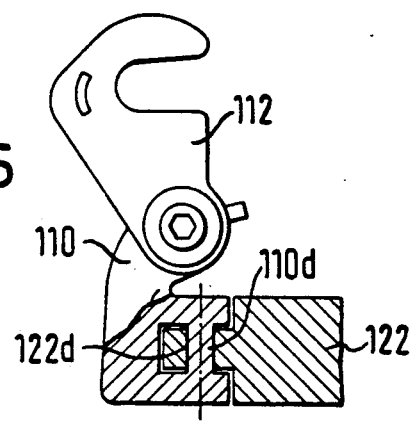
Figure 6:
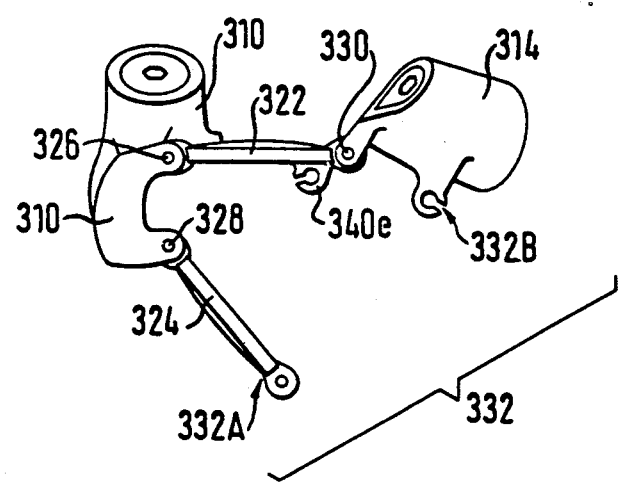
Figure 7:
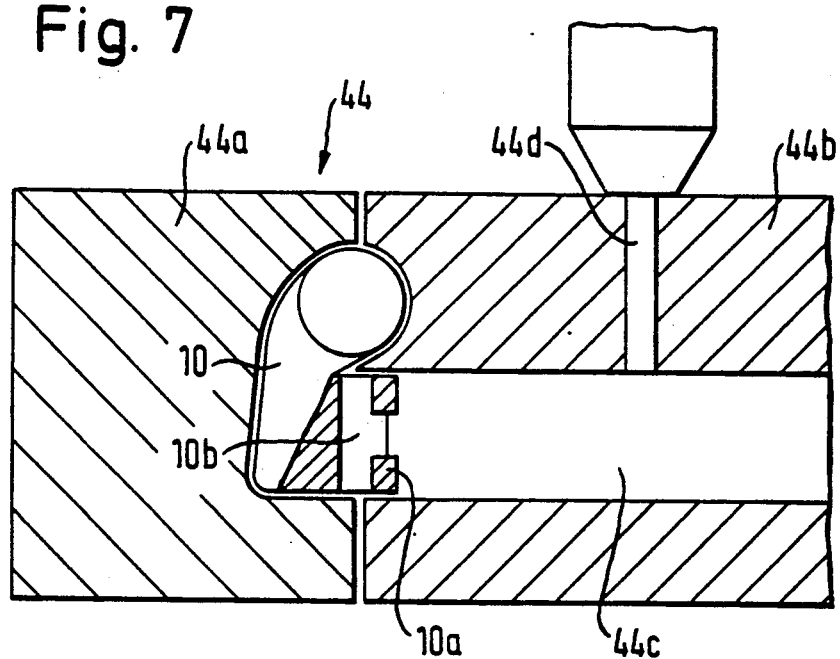

FIG.. 3 shows a view as shown in FIG. 2 with a modified embodiment;

FIG. 4 shows a joint section through a joint with a plane of section containing the joint axis;

FIG. 5 shows a sectional view as shown in FIG. 4 with a modified embodiment of the joint;

FIG. 6 shows a parallelogram linkage of a chain thrower mechanism with three components articulated with respect to each other and a fourth joint being still open;

FIG. 7 shows a mould cavity for manufacturing a joint as shown in FIG. 4, and

Figure 8:
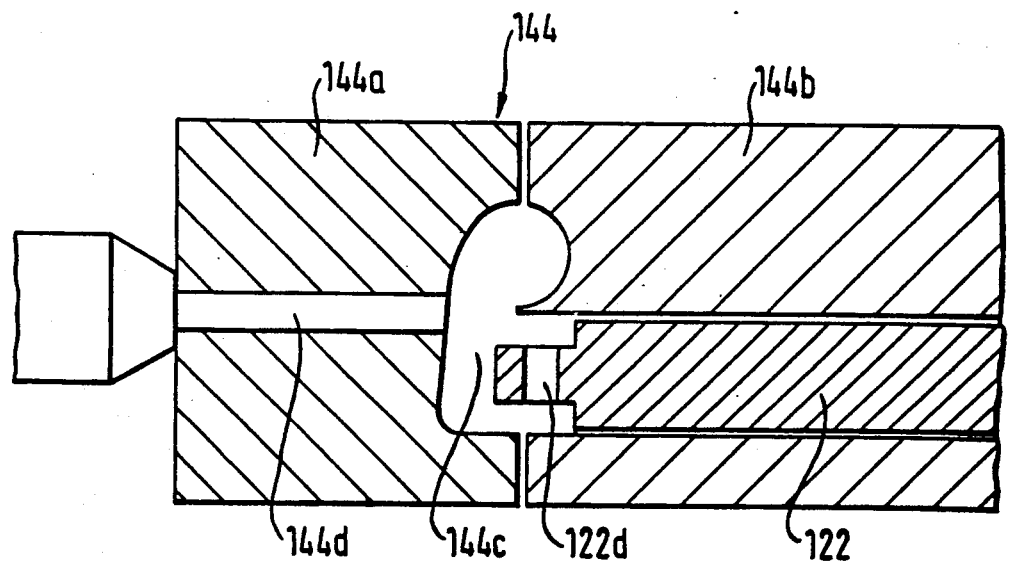

FIG. 8 shown a mould cavity for manufacturing a joint as shown in FIG. 5.

DETAILED DESCRIPTION OF THE PREFERRED EMBODIMENTS

Figure 1:
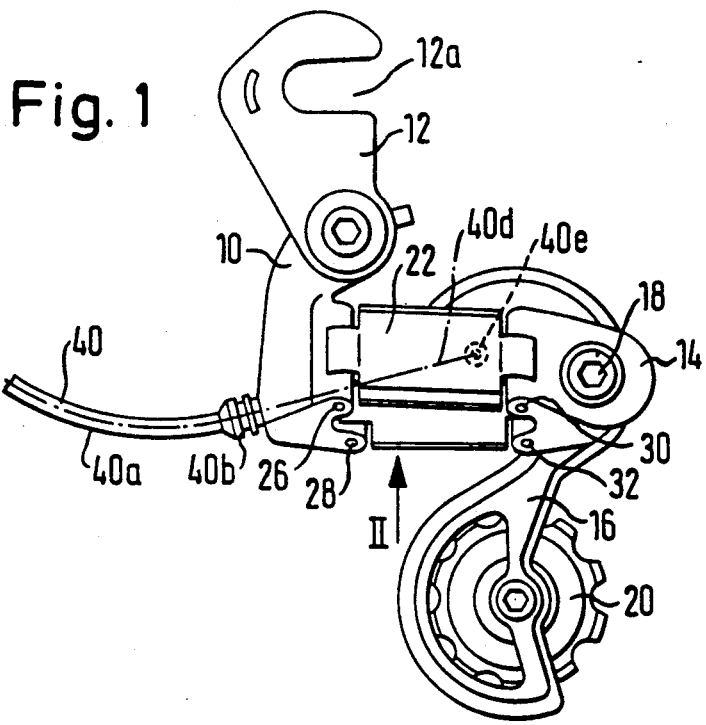
FIG. 1 shows an isometric view of a chain thrower mechanism.

In FIG. 1 a chain thrower mechanism comprises a frame side terminal member 10 which is hingedly connected with a mounting hook 12 to be fastened to the rear part of a bicycle frame. In mounting the hook 12 to the rear part of the bicycle frame the slot 12a is accommodating an end portion of the hub axle and a fastening nut (not shown) presses the hook 12 against the bicycle frame.

A thrower side terminal member is designated by 14. This thrower side terminal member 14 carries a chain thrower unit 16 which is pivotally mounted about an axis 18. This chain thrower unit comprises two chain guiding wheels, one of them being designated by 20. The thrower side terminal member 14 is connected as can be seen from FIG. 2 with the frame side terminal member 10 by two connecting members 22 and 24, such as to form a parallelogram linkage having four joints 26, 28, 30, 32. The joint axes of this parallelogram linkage are parallel to each other. The parallelogram linkage allows a movement of the thrower side terminal member 10 along a path indicated by the arrows 34 of FIG. 2. This path is substantially orthogonal with respect to the rearward wheel of the respective bicycle such that the chain (not shown) guided around the guiding wheels is dislocated in response to the movement of the thrower side terminal member 14 along the path 34 between a plurality of chain sprockets of the bicycle hub.

The parallelogram linkage is biased by a leaf spring 38 toward engagement with a first one of the chain sprockets and can be moved by a Bowden cable 40 such that the chain comes into engagement with the subsequent chain sprockets of the bicycle hub. The Bowden tube 40a is supported by a sleeve member 40b on the frame side terminal member 10 while the core wire 40d of the Bowden cable 40 is connected to an anchoring piece 40e integral with the connecting member 20.

In FIG. 4 there is shown the joint 26 having the joint axis 26a. This joint interconnects the frame side terminal member 10 and the connecting member 22. As can be seen from FIG. 4, the connecting member 22 is integral with a connecting pin 22a whereas the terminal member 10 is integral with a connecting eye 10a, said connecting eye 10a having a cylindrical hinge cavity 10b. The connecting pin 22a is received by the hinge cavity 10b.

The manufacturing of the joint 26 is shown in FIG. 7. It is assumed that the terminal member 10b has been manufactured by conventional injection moulding of a thermoplastics material into a respective mould (not shown). The connecting eye 10a and the hinge cavity 10b have been obtained by said injection moulding process. After the terminal member 10b has become rigid as a consequence of cooling it is inserted into a mould 44 consisting of two mould halfs 44a and 44b. Such in the mould 44 a mould cavity 44c is defined which corresponds to the connecting member 22. The mould 44 is provided with an injection channel 44d through which thermoplastified moulding material can be injected into the mould cavity 44c. It is to be pointed out that the terminal member 10 partially confines the mould cavity 44c such that the hinge cavity 10b is open to the rest of the mould cavity 44c. When moulding material is injected into the moulding cavity 44c the hinge cavity 10b is also filled such that the pin 22a (see FIG. 4) is shaped by the hinge cavity 10b and is integral with the connecting member 22. When the connecting member 22 and the pin 10b solidify they are subject to shrinkage. As a result of this shrinkage the pin 10b has a certain radial play with respect to the eye 10a as is shown in FIG. 4. As a result thereof the connecting member 22 is pivotable with respect to the terminal member 10 about the joint axis 26a. On the other hand, the shrinkage of the pin 22a can be controlled such that it is precisely adapted to the shape and to the dimensions of the hinge cavity 10b. With other words, the play between the pin 22a and the eye 10a can be dimensioned in accordance with the requirements of a precise acting joint. In order to prevent physical coalescence of the terminal member 10 and the connecting member 22 in the joint 26 during the moulding operation as shown in FIG. 7 the faces of the terminal member 10 shaping the connecting member 22 and the pin 10b during the moulding operation of FIG. 7 may be coated with a separating agent. Additionally and/or alternatively the material from which the terminal member 10 is made and the material from which the connecting member 22 is made may be so different in chemical and physical respect that coalescence is avoided. It is also possible to use differently coloured materials for moulding the terminal member 10 and the connecting member 22 in order to obtain a desired appearance of the thrower mechanism. It should also be pointed out that the anchoring piece 40e can be injection moulded integral with the connecting member 22 whereas the support piece 44b can be injection moulded integral with the terminal member 10.

It is now referred to FIG. 5 and FIG. 8. According to FIG. 8 the connecting member 122 with the hinge cavity 122d is prefabricated e.g. by injection moulding in an injection mould which is not shown. Hereupon the connecting member 122 is inserted into the mould such as to partially confine a mould cavity 144c. The hinge cavity 122d is in flow communication with the remaining mould cavity 144c. When a moulding material is injected into the mould cavity 144c through the injection channel 144d the terminal member 110 is obtained as shown in FIG. 5. For avoiding physical coalescence of the connecting member 122 and the terminal member 110 the same measures of precaution may here be taken as described in connection with FIG. 4 and FIG. 7.

It is preferable to provide the pin portion 22a and 110d in FIG. 4 and FIG. 5, respectively, as an integral part of the injection moulded members 22 and 110, respectively, in view of the shrinkage of the respective later moulded members so as to obtain the desired play between the pin portion and the hinge cavity.

It will be easily understood that according to FIG. 4 and FIG. 7 it is possible to prefabricate both terminal members 10 and 14 and to insert both of them into respective mould cavities for injection moulding the connecting members 22 and 24 as shown in FIG. 7. This injection moulding can in such case be performed substantially simultaneously.

It is also possible to prefabricate e.g. by injection moulding the connecting members such as the connecting member 122 with complete respective hinge portions, as e.g. 122d in FIG. 8, and to insert these two connecting members into respective mould cavities such as to simultaneously obtain hereinafter the terminal members such as the terminal member 110 with the hinge pin 110d in the mould cavity 144c of FIG. 8.

Referring to FIG. 2 it is to be pointed out that also the spring 38 can be inserted into the terminal member 10 during or after injection moulding the terminal member 10. More particularly, it is possible to provide a receiving slot for the spring 38 within the terminal member 10 and to insert herinafter the spring 38 into the respective slot. It is furthermore possible to obtain the spring 38 as an integral part of either the terminal member 10 or the connecting member 22 when forming the respective member by injection moulding.

Figure 3:
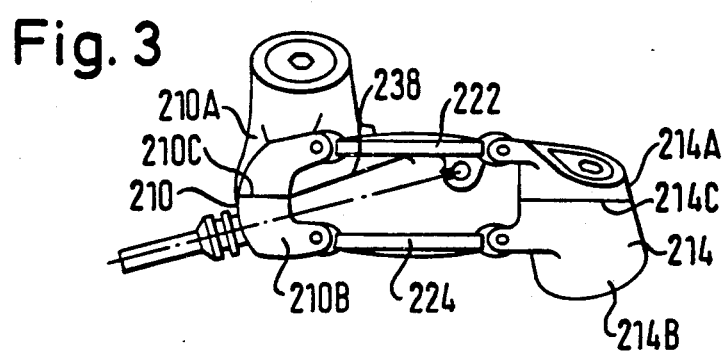

Referring now to FIG. 3 one can see that the terminal members 210 and 214 may be composed of half members 210 A, 210 B and 214 A, 214 B respectively. The component assemblies 210 A, 222, 214 A, on the one hand, 210 B, 224, 214 B, on the other hand, may be obtained as described in connection with FIG. 4, FIG. 7 and FIG. 5, FIG. 8. The terminal members 210 A, 210 B, on the one hand, and 214 A, 214 B, on the other hand, may hereupon be composed to form the terminal member 210, 214 by adhesive bonding or ultrasonic welding in the planes 210 C and 214 C. The separating planes 210C and 214 C are selected such that the spring 238 and the hook corresponding to hook 12 of FIG. 1, and further the mounting of a spring acting onto the thrower unit 16 is easily possible. The manufacturing of the terminal members 210 and 214 from two respective half members involves additional operations, but allows easily mounting of the respective additional parts and further allows to obtain complicated surface forms of the terminal member 210, 214.

It will be easily understood that for obtaining an articulated component unit such as 210 A, 222, 214 A one can either prefabricate the half members 210 A and 214 A and thereafter obtain the connecting member 222 in accordance with FIG. 7. Alternatively, one can prefabricate the interconnecting member 22 and hereupon obtain the partial terminal members 210 A, B and 214 A, B by injection moulding according to FIG. 8.

It will be further understood that one can alternatively compose each of the connecting members 222, 224 from two respective half members and finally combine these half members into the connecting members.

Furthermore one can see from FIG. 3 that the spring 238 can be mounted between the half members 210 A and 210 B in the separation plane 210 C.

Referring now to FIG. 6 one can see that a component assembly 310, 314, 324, 322 with only three joints 326, 328, 330 can be obtained by one of the methods described with respect to FIG. 7 and FIG. 8. In this case the joint 332 can finally be completed by mechanical engagement of prefabricated joint portions 332 A and 332 B as shown in FIG. 6. Again this method of manufacturing is somewhat more complicated than the method in which all joints are obtained according to FIG. 7 or FIG. 8. However, the completing of the parallelogram by mechanically engaging the joint portions 332 A and 332 B facilitates the mounting of additional parts such as the anchoring of the Bowden wire and the positioning of the springs.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

I claim:

1. A method of manufacturing a chain thrower mechanism for gear change operations in a bicycle, said chain thrower mechanism comprising two terminal members (10, 14), namely a frame side terminal member (10) adapted to be fastened on a bicycle frame, and a thrower side terminal member (14) adapted to be assembled with a chain thrower unit (16), and further comprising at least one connecting member (22, 24) hingedly connected with both said terminal members (10, 14) for guiding said thrower side terminal member (14) along a predetermined path (34) with respect to said frame side terminal member (10), said chain thrower unit (16) being adapted for engagement with a bicycle chain and for dislocating said bicycle chain between at least two chain sprockets in response to movement of said thrower side terminal member (14) along said predetermined path (34), at least one articulated component assembly (10, 22) of said chain thrower mechanism comprising at least two components (10, 22), one (10) of said at least two components (10, 22) being at least a part of one (10) of said terminal members (10, 14) and another one (22) of said at least two components (10, 22) being at least a part of a connecting member (22), said at least two components (10, 22) being articulated with respect to each other by a joint (26) having a joint axis, said joint (26) being established by respective complementary and mutually engaged hinge portions (10b, 22a) of said components (10, 22), said method comprising manufacturing said at least one component assembly (10, 22) by a) prefabricating a first one (10) of said at least two components (10, 22) with a respective hinge portion (10a, 10b);

b) providing a mould cavity (44c) for moulding a second one (22) of said at least two components (10, 22), said mould cavity (44c) being partially confined by said first component (10) such that the hinge portion (10a, 10b) of said first component (10) is inside of and in fluid flow communication with said mould cavity (44c);

c) filling said mould cavity (44c) with a liquid moulding material such as to obtain said second component (22) with the respective hinge portion (22a) of said second component (22) being shaped by the complementary hinge portion (10a, 10b) of said first component (10).

2. A method as claimed in claim 1,
said first component (10) being prefabricated by a moulding operation.

3. A method as claimed in claim 2,
said second-component (22) being made from a liquid moulding material subject to shrinkage during or after hardening, said complementary hinge portions (10a, 10b, 22a) of said first (10) and said second (22) components (10, 22) being shaped and dimensioned such that pivotal movement of said first (10) and said second (22) components (10, 22) in said joint (26) becomes possible after hardening and shrinkage of said second component (22a) by a mutual bearing play of the respective hinge portions (10a, 10b, 22a), said bearing play being a result of shrinkage of the hinge portion of said second component (22).

4. A method as claimed of claim 1,
said hinge portion (10a, 10b) of said first component (10) being at least partially coated with a separating agent before filling said liquid moulding material into said mould cavity (44c), said separating agent preventing physical coalescing of said hinge portions (10a, 10b, 22a) of said first (10) and said second (22) components (10, 22).

5. A method as claimed of claim 1,
said first component (10) and said second component (22) being made of different materials, said difference of materials preventing physical coalescing of the hinge portions (10a, 10b, 22a) of said first (10) and said second (22) components (10, 22).

6. A method as claimed in claim 5,
the difference of said materials being a consequence of different amounts of additives added to the respective materials.

7. A method as claimed in claim 6,
one of said materials having a larger content of a sliding additive as compared with the other one.

8. A method as claimed in claim 1,
said first (10) and said second component (22) being made of materials having different colour.

9. A method as claimed in claim 1,
said hinge portion (10a, 10b) of said prefabricated component (10) comprising a cylindrical hinge cavity (10b), the hinge portion (22a) of said second component (22) comprising a cylindrical pin portion (22) being shaped by inflow of said moulding material into said hinge cavity (10b).

10. A method as claimed in claim 1,
said articulated component assembly (10, 22, 24) comprising more than two components (10, 22, 24), at least one component (10) with respective hinge portions (10a, 10b) being shaped by moulding said moulding material into a respective mould cavity (44c), said respective mould cavity (44c) being partially confined by at least two prefabricated further components (22, 24) having respective complementary hinge portions.

11. A method as claimed in claim 1,
said articulated component assembly comprising more than two components (10, 22, 24), at least two components (22, 24) with respective hinge portions being shaped by moulding said moulding material into respective mould cavities, said respective mould cavities being partially confined by at least one prefabricated further component (10) having respective complementary hinge portions.

12. A method as claimed in claim 1,
said articulated component assembly (10, 14, 22, 24) comprising two pairs of analogous components, namely a pair of terminal members (10, 14) and a pair of connecting members (22, 24), the analogous components (10, 14) of a first pair being prefabricated with respective hinge portions, the analogous components (10, 14) of the other pair being shaped by filling said moulding material into respective mould cavities partially confined by said prefabricated analogous components (10, 14).

13. A method as claimed in claim 12,
said terminal members (10, 14) being prefabricated.

14. A method as claimed in claim 12,
said connecting members (22, 24) being prefabricated.

15. A method as claimed in claim 1,
said articulated component assembly (326, 330, 328) comprising a plurality of joints (326, 328, 330, 332), only a part of said joints of said plurality being obtained by said moulding of moulding material into a mould cavity partially confined by a prefabricated component, the remaining joints (332) being established by assembling respective pre-shaped hinge portions (332 A, 332 B).

16. A method as claimed in claim 15,
said articulated component assembly comprising two pairs (310, 314; 322, 324) of analogous components, namely a pair of terminal members (310, 314) and a pair of connecting members (322, 324) with a total number of four joints (326, 330, 328, 332), three of said joints (326, 330, 328) being obtained by filling liquid moulding material into respective mould cavities partially confined by at least one prefabricated component, the fourth joint (332) being obtained by assembling respective hinge portions (332 A, 332 B).

17. A method as claimed in claim 1,
said chain thrower mechanism being completed by combining at least two articulated component assemblies (210 A, 222, 214 A; 210 B, 224, 214 B), said combining comprising composing at least two (210) of said terminal members (210, 214) and said connecting members (222, 224) from respective partial members (210 A, 210 B) at a location (210 C) remote from the respective joints.

18. A method as claimed in claim 17,
said chain thrower mechanism comprising two terminal members (210, 214) and two connecting members (222, 224) in parallelogram arrangement, a first articulated component assembly (210 A, 222, 214 A) comprising one connecting member (222) and adjacent parts (210 A, 214 A) of said terminal members (210, 214), a second articulated component assembly (210 B, 224, 214 B) comprising the other connecting member (224) and the remaining parts (210 B, 214 B) of said terminal members (210, 214), respective parts (210 A, 210 B; 214 A, 214 B) of said terminal members (210, 214) being composed such as to form said terminal members (210, 214).

19. A method as claimed in claim 1,
said mould cavity (44c) being filled with said liquid moulding material by injection moulding.

20. A method as claimed in claim 1,
said liquid moulding material being a synthetic plastics material.

21. A method as claimed in claim 20,
said synthetic plastics material being a thermoplastic material.

22. A chain thrower mechanism for gear change in a bicycle, said chain thrower mechanism comprising two terminal members (10, 14), namely a frame side terminal member (10) adapted to be fastened on a bicycle frame, and a thrower side terminal member (14) adapted to be assembled with a chain thrower unit (16), and further comprising at least one connecting member (22, 24) hingedly connected with both said terminal members (10, 14) for guiding said thrower side terminal member (14) along a predetermined path (34) with respect to said frame side terminal member (10),
said chain thrower unit (16) being adapted for engagement with a bicycle chain and for dislocating said bicycle chain between at least two chain sprockets in response to movement of said thrower side terminal member (14) along said predetermined path, at least one articulated component assembly (10, 22) of said chain thrower mechanism comprising at least two components (10, 22), one (10) of said at least two components (10, 22) being at least a part of one (10) of said terminal members (10, 14) and another one (22) of said at least two components (10, 22) being at least a part of a connecting member (22, 24), said at least two components (10, 22) being articulated with respect to each other by a joint (26) having a joint-axis, said joint being established by respective complementary and mutually engaged hinge portions (10a, 10b, 22a) of said components (10, 22),
said complementary hinge portions (10a, 10b) being mutually engaged by prefabricating a first component (10) with a respective hinge portion (10a, 10b) and moulding a second component with the respective hinge portion (22a) in using said hinge portion (10a, 10b) of said first component (10) as a shape giving part for said hinge portion (22a) of said second component (22).

23. A chain thrower mechanism as claimed in claim 22,
at least one of said components (10, 22) being integrally shaped with an auxiliary element such as one of an anchoring piece for a wire or spring member (238).

* * * * *